June 3, 1958 S. S. FOX 2,836,957
FUEL CONTROL FOR A GAS TURBINE POWER PLANT
Filed June 21, 1952 2 Sheets-Sheet 2
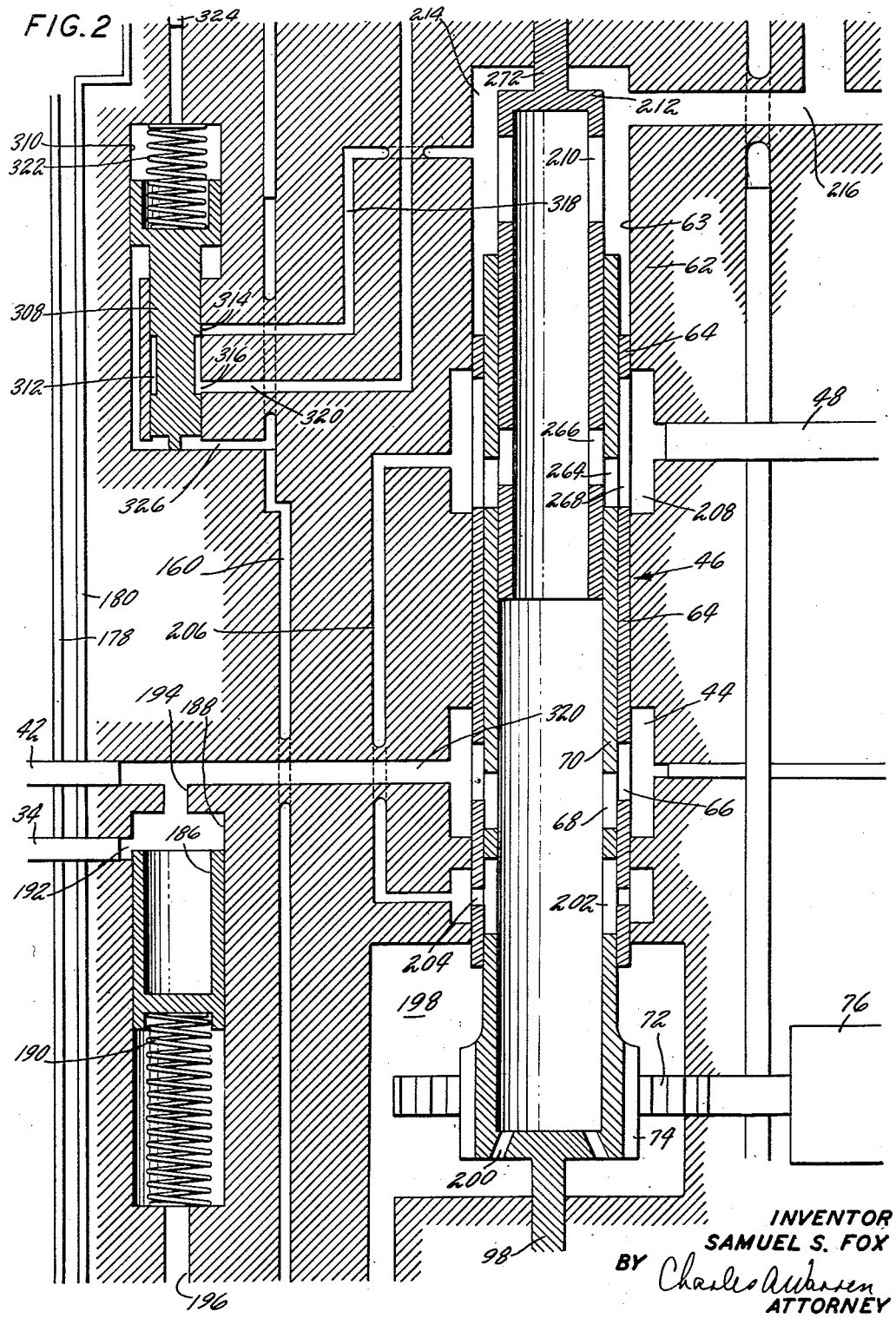
INVENTOR
SAMUEL S. FOX
BY Charles A Warren
ATTORNEY

# United States Patent Office 2,836,957
Patented June 3, 1958

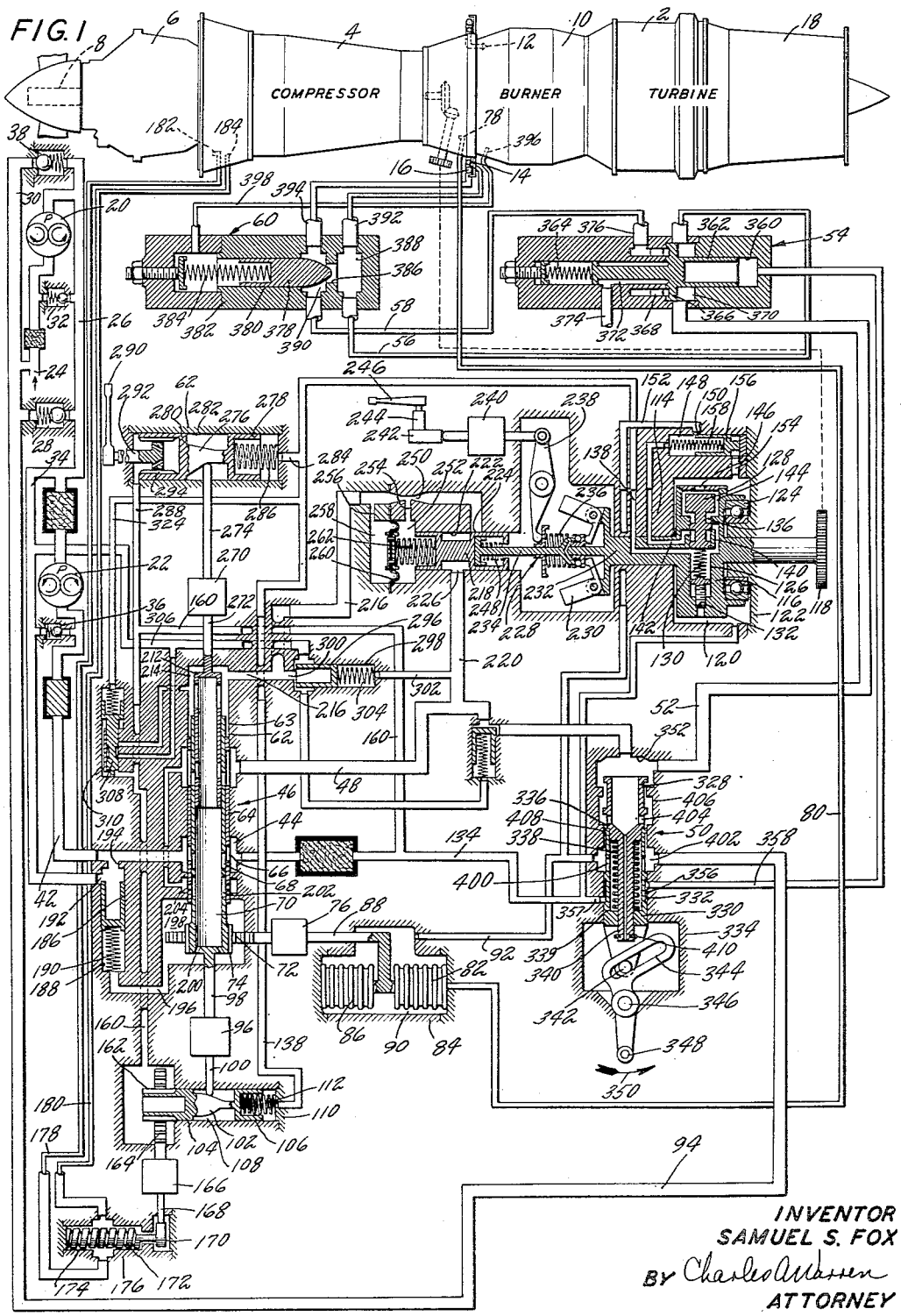

2,836,957

FUEL CONTROL FOR A GAS TURBINE POWER PLANT

Samuel S. Fox, West Hartford, Conn., assignor to United Aircraft Corporation, East Hartford, Conn., a corporation of Delaware Application June 21, 1952, Serial No. 294,963

15 Claims. (Cl. 60—39.28)

This invention relates to a fuel control for a gas turbine power plant.

One feature of the invention is a metering valve which is movable angularly and longitudinally to vary the flow as a function of turbine speed, a compressor pressure and a compressor temperature, the purpose of this valve being to limit the maximum fuel flow to the power plant under static or transient operating conditions. This arrangement provides for controlling the acceleration of the power plant such that the fuel supplied to the power plant will not be in excess of the amount that can be burned safely.

Another feature is the arrangement of cooperating rectangular ports in the metering valve and the surrounding casing so that the effective port area will be a function of the product of the angular and longitudinal movements of the valve.

One feature of the invention is the delivery of fuel through the maximum flow metering valve to a chamber from which the flow is through parallel paths to the combustors with the several parallel flows individually controlled by separate variables such as compressor pressure and engine speed for deceleration and for constant speed operation or by an orifice for minimum flow during ground idling of the power plant.

Other features and advantages will be apparent from the specification and claims and from the accompanying drawings which illustrate an embodiment of the invention.

Fig. 1 is a diagrammatic view of the fuel control with parts in section.

Fig. 2 is a diagrammatic view on a larger scale showing the metering valve in section.

The fuel control system is shown in connection with a gas turbine power plant in which the turbine 2 develops power enough not only to drive the compressor 4 but also for delivering additional power through a reduction gear 6 to a propeller shaft 8. Air from the compressor 4 is delivered to a combustor 10 into which fuel is delivered through nozzles 12 from a primary fuel manifold 14 and a secondary fuel manifold 16. The combustion of fuel in the combustor provides the power for the turbine and the exhaust gas from the turbine is delivered through a thrust nozzle 18.

Fuel for the combustor is supplied by pumps 20 and 22 operating in series, the pump 20 being the low pressure pump and delivering fuel from the inlet conduit 24 through a conduit 26 to the pump 22. A relief valve 28 between conduit 26 and return conduit 30 connecting with the inlet conduit 24 normally controls the pressure at the inlet of the high pressure pump 22 and another relief valve 32 which vents into the inlet conduit 24 limits the maximum delivery pressure of the low pressure pump. A high pressure return conduit 34 communicates with the high pressure pump inlet conduit 26, as shown. Another pressure relief valve 36 is located in the discharge conduit of the high pressure pump and vents into the high pressure return conduit 34 to limit the maximum pressure of the high pressure pump discharge to a preselected value. Conduit 30 has another check valve 38 so located that if the pump 20 fails to function the high pressure pump 22 may draw fuel directly from the inlet conduit 24 through conduit 30 and past check valve 38 into conduit 26 and thence to the pump.

From the high pressure pump 22 fuel is delivered through a high pressure conduit 42 to a port 44 in the main metering valve 46. From the main metering valve the flow is generally through a delivery conduit 48 to shut-off valve 50 and thence through a conduit 52 to the fuel dump valve 54. From valve 54 conduit 56 delivers the fuel through a pressurizing valve 60 to the primary fuel manifold 14 and the secondary fuel manifold 16.

Referring now to the metering valve 46, this valve consists of a housing 62, Fig. 1, having a bore 63 which receives a fixed liner 64. This liner has a port 66 therein which communicates with the annular port 44 above referred to. The flow from the port 44 into the hollow center of the metering valve is metered by the port 66 and a cooperating port 68 in a sleeve 70 located within the liner 64. The sleeve 70 is adapted to be moved axially and also to be rotated for varying the effective port area between the aligned ports 66 and 68 and it is the flow through this port area that determines the maximum fuel flow permissible for the power plant at any transient operating condition.

The movements of the sleeve 70 are responsive to certain operating characteristics of the turbine and in the arrangement shown the sleeve is moved in response to temperature changes in the compressor inlet temperature, in response to changes in the compressor discharge pressure, and in response to changes in speed of the rotor of the gas turbine. The basic actuation of the main metering valve is described and claimed in the copending application of Torell and Hull, Serial No. 240,304, filed August 4, 1951.

In the arrangement shown, the rotation of the sleeve 70 is in response to changes in compressor discharge pressure and is accomplished through a rack 72 engaging with a pinion 74 formed on the end of the sleeve. The rack is moved through a servomotor 76 which is controlled by compressor discharge pressure. For sensing compressor discharge pressure the power plant has a pressure tap 78 located at the downstream end of the compressor and this tap is connected by a duct 80 to a pressure sensing bellows 82 in a housing 84. Also within the housing is an evacuated bellows 86 to cause the motion of the arm 88 connected to the bellows to be a function of the absolute pressure of the compressor discharge.

The chamber 90 in which the bellows 82 and 86 are located may be vented by conduit 92 and through shut-off valve 50 to a low pressure drain 94 as will hereinafter appear. The arm 88 is connected to the servomotor 76 and the motion of this arm functions through the servomotor to obtain a corresponding movement of the rack 72.

The sleeve 70 is moved axially as a function of turbine speed through a follower servomotor 96 connected to a stem 98 on the sleeve valve. The servomotor is actuated through a projecting follower 100 engaging with a three-dimensional cam 102. This cam is located between plungers 104 and 106 in a bore 108 in a housing 110. The plungers and the interconnecting cam form an integral structure which is urged in one direction by a spring 112. The position of the cam 102 axially is controlled by the turbine speed and in the arrangement shown the turbine speed is indicated by means of a speed signal generator 114 which indicates speed as a pressure function.

The speed signal generator 114 includes a rotor 116 adapted to be driven at a speed proportional to the turbine rotor speed through an integral pinion 118. The rotor 116 is journalled in a recess 120 in a housing 122 by a bearing 124. The rotor has a diametrically positioned bore 126 in which is positioned a weighted plunger valve 128 moved in one direction by a spring 130. It will be understood that this spring may be adjustably supported as by a stop screw 132. The plunger valve 128 is movable radially outward as the rotor 116 spins and the outward movement is balanced by fluid pressure which is controlled within the bore 126 by the position of the plunger valve.

The chamber 120 is supplied with fluid under pressure (fuel is used for convenience) by a conduit 134 extending from the annular port 44 in the main metering valve so that the chamber 120 is at the same pressure as the discharge pressure of the high pressure pump. The rotor 116 has a throttled passage 136 through which fluid from the chamber 120 reaches bore 126 to act on the inner end of the plunger valve 128. Also communicating with the bore 126 at the inner end of the valve is a conduit 138 in which the pressure varies as a function of the speed. While the rotor 116 is turning at a fixed speed the pressures which cause the plunger valve 128 to be balanced stay constant. If, however, the rotor 116 speeds up, the plunger valve 128 moves out and connects a by-pass passage 140 in the rotor 116 to a vent conduit 142. The inlet end of by-pass passage 140 communicates with the bore 126 at the same radial position as the conduit 138 so that venting through this by-pass passage drops the pressure in bore 126 and causes the plunger valve 128 to become stable with a lower pressure in bore 126 and with a resultant lower pressure in conduit 138.

If, on the other hand, the rotor 116 slows down the pressures acting on the plunger valve cause it to move inwardly so that the by-pass passage 140 is vented into a chamber 144 in the rotor through throttled passage 136 and thence through a port 146 to the chamber 120. The chamber 120 is, as above stated, at the pressure of the high pressure pump so that the flow of pressure fluid is then through the chamber 144 and the by-pass passage 140 into the bore 126 thereby increasing the pressure until the valve is again balanced at the lower speed but at a higher pressure in bore 126 and conduit 138.

The vent conduit 142 is connected to the end of a bore 148 in the same housing 122. This bore has a lateral port 150 connected by a conduit 152 to the conduit 92 and thence to the low pressure return duct 94. A passage 154 connects the chamber 120 to the end of the bore 148 remote from the duct 142. A plunger valve 156 is located within the bore 148 and is resiliently urged toward the right to uncover the port 150 by a spring 158. With this arrangement the pressure acting through chamber 120 and passage 154 holds the plunger valve 156 in a position to close port 150 until sufficient operating pressures are developed within the speed signal generator. Thereafter the plunger valve 156 acts as a throttle to maintain the necessary operating pressure fluid within the speed signal generator.

Conduit 138 is connected to one end (the right hand end shown) of bore 108 to act on plunger 106 so that variations in pressure on the plunger, proportional to a function of the speed, will shift cam 102 with respect to the follower 100. Since the fluid pressure signal from the speed signal generator increases as speed decreases it will be obvious that the pressure will vary as an inverse function of speed.

The opposite end of the cam 102, that is the plunger 104, is subjected to the high pressure pump pressure through a conduit 160 extending from the conduit 134 to the housing 110 at the left-hand end of the plunger 104. Thus the motion of the cam 102 is a direct function of the speed of the turbine as indicated by the speed signal generator. The sleeve 70 is thus caused to move axially in accordance with the slope of the cam as a result of changes in turbine speed.

The cam 102 is also caused to rotate and this rotation is a function of a compressor temperature which in the arrangement shown is compressor inlet temperature. To accomplish this, the plunger 104 has an integral gear 162 in mesh with a rack 164 connected to a follower servo 166. The servo itself is actuated through a finger 168 riding on a cam 170 which is turned by means of a temperature sensitive element 172 located in a chamber 174 in a housing 176. Ducts 178 and 180 provide for a flow of air from the compressor inlet through the chamber 174 and back into the compressor. The duct 178 is connected to a forwardly opening tap 182 located within the compressor inlet and conduit 180 is connected to a flush inlet 184 in the compressor wall.

It is thus apparent that the sleeve 70 which carries the main metering port 68 is moved angularly as a function of compressor discharge pressure and is moved axially as a function of both turbine speed and compressor inlet temperature. The delivery of the fuel into the center of the metering valve is therefore limited by these three variables and the metering port 68 admits the maximum permissible flow at any instantaneous value of the three variables.

The pressure drop across the cooperating ports 66 and 68 is maintained constant by a valve plunger 186 in a bore 188, the valve being normally urged by a spring 190 to a position to close a laterally located port 192 communicating with the high pressure return duct 34. The end of the bore 188 remote from the spring is connected by a short duct 194 to the high pressure supply conduit 42 and the opposite end of the bore is connected by a conduit 196 to a chamber 198 which encloses the lower end of the sleeve 70 and communicates with the interior of the sleeve by passages 200. Thus the plunger valve 186 is subjected at one end to the pressure upstream of the ports and at its opposite end to the pressure downstream of the ports and functions to by-pass enough of the fuel from the main supply conduit 42 by the valve more or less closing the port 192 so that the pressure drop across the ports will remain constant.

The interior of the sleeve 70 functions as a chamber into which the maximum fuel flow for the instantaneous operating conditions of the turbine at the particular moment is metered. From this chamber, parallel fuel flow paths direct fuel to the delivery conduit 48. One of these paths is through a small set of ports 202 and a cooperating set of ports 204 in the liner 64. The shape of the ports 202 is such that translational movement of the sleeve 70 has no effect on the flow area although this area is varied by rotational movement of the sleeve 70. As above pointed out, the rotational movement of this sleeve is a function of the compressor discharge pressure so that the flow through ports 202 and 204 will be proportional to the compressor discharge pressure, thereby establishing the minimum fuel flow during deceleration to prevent lean burner blowout. From the ports 202 and 204 the fuel flows through a passage 206, Fig. 2, to an annular groove 208 located in the housing 62 and surrounding the fixed sleeve 64. The main fuel delivery conduit 48 connects with this groove 208.

Another parallel path for the fuel flow from the interior of the sleeve 70 is through large area ports 210 in an inner sleeve 212 located within sleeve 70. These ports 210 offer no restriction to fuel flow from within the sleeve 70 into the space 214 at the upper end of the bore 63. From chamber 214 fuel is delivered by a conduit 216 to an idle speed governing valve 218 and thence through another conduit 220 to the delivery conduit 48. The idle speed governing valve 218 is located in a bore 222 which has axially spaced ports 224 and 226 connecting respectively with conduit 216 and conduit 220. The valve 218 is moved to the left to close port 224 by a governor 228 including flyweights 230 carried by an extension 232 on the speed signal generator rotor 116.

As the speed of the turbine rotor increases the flyweights tend to move a rod 234 to the left, this rod forming a connection between the governor 228 and the valve 218. A speeder spring 236 resists the action of the flyweights and the tension of this speeder spring is set through a lever 238 connected through a follower servo 240 to a cam 242 on the shaft 244 for the manually actuated idle-speed control arm 246. A spring 248 provides a resilient connection between the flyweights and the valve 218 such that the valve does not of necessity follow the motion of the flyweights during a speed reduction.

In addition to the movement of the valve 218 by the flyweights, the valve is also moved as a function of the fuel flow through the conduit 216. For this purpose a venturi 250 is provided in the conduit and the pressure in the throat of the venturi is transmitted to a chamber 252 through a conduit 254. The pressure in the conduit 216 upstream of the venturi is transmitted by a similar conduit 256 to a chamber 258. A diaphragm 260 forms a dividing wall between the chambers 252 and 258 and the motion of this diaphragm is transmitted through a spring 262 to the valve 218, the spring 262 being normally arranged to move the valve 218 to the right in the direction to open the valve.

The valve 218 and its actuating mechanism are so arranged that the valve begins to reduce the effective area of port 224 at a speed dependent upon the setting of the control arm 246 and this reduction in area continues as a function of increasing speed until it is closed. In operation the valve will close only to the point where the fuel flow being metered is equal to that required by the engine at the idle speed selected by the setting of the arm 246.

Another path for the flow of fuel from the chamber within the sleeve 70 is through cooperating ports 264 and ports 266 in sleeve 70 and inner sleeve 212. These ports communicate through large area ports 268 in the liner 64 with the annular groove 208. The effective area of the cooperating ports 264 and 266 is varied as a function of engine speed by translational movement of the inner sleeve 212. This is procured through a follower servo 270 connected to a projecting rod 272 on the inner sleeve 212 and having a feeler rod 274 engaging with a three-dimension cam 276. This cam is located between cooperating plungers 278 and 280 in a bore 282 in the housing 62. The pressure signal from the speed signal generator through conduit 138 is delivered to the right-hand end of bore 282 through a conduit 284. A coil spring 286 acts in conjunction with this pressure to move the plungers and the associated cam 276 to the left. The other end of bore 282 is connected by a conduit 288 to the conduit 160 which carries fuel at the delivery pressure of the high pressure pump. With this arrangement, as the rotor speed increases the pressure acting on plunger 278 decreases causing a movement of cam 276 to the right with a rsultant decrease in the effective area of the ports 264 and 266. In this way the inner sleeve 212 is moved as a function of rotor speed to increase fuel flow with decreasing speed thereby functioning to maintain the selected turbine speed.

In addition to the translational movement of the cam 276 the latter may be rotated from a fuel control lever 290 connected through a shaft 292 and splines 294 to the plunger 280.

The pressure drop through the orifice defined between the cooperating ports 264 and 266 is controlled by a by-pass valve in the form of a plunger 296 in bore 298. One end of the bore 298 communicates by a conduit 300 with the conduit 216 and the other end of the bore communicates by a conduit 302 with the conduit 220 which in turn connects with the delivery conduit 48. A spring 304 tends to hold the valve 296 closed but as the pressure drop across the ports 264 and 266 increases, the valve opens to discharge fuel into a conduit 306 communicating with the return conduit 34. It may be noted that this valve 296 is so arranged as to function for both the pressure drop across the ports 264 and 266 and also the pressure drop across the idle-speed governing valve 218.

It may be noted that in addition to the translational movement of the inner sleeve 212 for controlling the effective area of the ports 264 and 266, compensation for flight condition is accomplished through the movements of the sleeve 70 as a function of compressor inlet temperature and compressor discharge pressure both as above described.

An overspeed limiting valve 308 provides for by-passing a part of the fuel within the sleeve 70 if the pressure signal from the speed signal generator indicates that the rotor is above the established speed. The valve 308 is located in a bore 310 in the housing 62 and has a groove 312 which in its operative position establishes a fuel connection between spaced ports 314 and 316. Port 314 is connected by a conduit 318 to the chamber 214 and port 316 is connected by conduit 320 to the return conduit 306. Thus at turbine overspeed fuel flows through this valve to diminish the quantity of fuel delivered to the turbine. The valve 308 is normally held in the inoperative position shown by a spring 322 in which the valve closes port 314. The end of the bore 310 adjacent the spring 322 is connected by a conduit 324 to the pressure conduit 138 from the speed signal generator. The other end of the bore communicates through a conduit 326 with the pressure conduit 288. Thus as the turbine overspeeds the pressure signal from the speed signal generator is reduced sufficiently for the pressure acting on the open end of the valve 308 to move it upward to connect ports 314 and 316.

As above stated, from the delivery conduit 48 fuel flows past the shut-off valve 50 and thence to the power plant. The shut-off valve is in the form of a plunger 328 slidable in a sleeve 330 which in turn is guided within a bore 332 in a housing 334. Downward movement of the plunger 328 with respect to the sleeve is limited by contact between a shoulder 336 on the plunger and the end of the sleeve. A coil spring 338 located in a space 339 surrounding a projecting stem 340 on the plunger normally urges the plunger in an upward direction. The sleeve 330 carries a pin 342 engaging a slot 344 in a lever 346 having a projecting handle 348 by which it is actuated. Movement of the lever in the direction of the arrow 350 moves the plunger and sleeve upward such that the upper end of the plunger engages a seat 352 to close off the flow of fuel from the delivery conduit 48 which enters the bore 332 at one end to the outlet conduit 52 thereby effectively cutting off the supply of fuel to the power plant.

When the plunger and sleeve are moved into closed position, a groove 356 in the outer surface of the sleeve closes the end of a pressure conduit 357 communicating with pressure conduit 134 and establishes communication between the end of a conduit 358 and the drain conduit 94. The conduit 358 extends to the fuel dump valve and in the normal operating position of the shut-off lever admits fuel under pressure from conduit 134 through conduit 358 to the end of the bore 360 in the dump valve thereby holding the plunger 362 in a position to deliver fuel through the dump valve and thence to the power plant.

When the shut-off valve is closed and pressure drops in the end of the bore 360 of the dump valve, a spring 364 moves the plunger 362 into a position to drain the fuel manifold system downstream of the dump valve thereby preventing any further delivery of fuel to the power plant. To accomplish this the plunger 362 has a valve disc 366 thereon which during operation is in the position shown to close off an annular groove 368 from communication with the end of the supply pipe 52 and also from communication with the delivery pipe 56. In the position shown, plunger 362 permits direct flow of fuel to the dump valve from conduit 52 to conduit 56 and thence to the engine. When the dump valve is open, however, the disc 366 moves in a recess 370 which permits communication from each of conduits 52 and 56 to the annular groove 368 and thence around a groove 372 on the plunger to a drain 374. With the dump valve in fuel dumping position fuel also flows out of conduit 58 through passages 376 in the dump valve and thence into the groove 368 and to the drain.

Downstream of the dump valve is the fuel manifold pressurizing valve 60 which includes a plunger 378 slidable in a bore 380 and housing 382, the plunger being urged by a spring 384 into a position to engage a valve seat 386 located between a primary fuel chamber 388 and a secondary fuel chamber 390. The primary fuel chamber 388 communicates with conduit 56 and with a primary delivery conduit 392 from the pressurizing valve to the fuel manifold 14. The chamber 390 communicates with the conduit 58 and also with a conduit 394 to the secondary fuel manifold 16. As pressure builds up in the primary fuel chamber 388 the plunger 378 is moved against spring 384 to open a path for fuel between the chambers 388 and 390 so that fuel is divided between the primary and secondary fuel chambers. It will be apparent that the conduit 58 serves as a drain for the secondary fuel conduit 394.

The pressure of fuel at which the plunger 378 is moved to permit flow between the chambers 388 and 390 is varied as a function of the pressure within the combustor. For this purpose, a pressure tap 396 in the combustor communicates as by a conduit 398 with the bore 380 at the end opposite to the valve seat 386 such that as pressure increases within the combustor this pressure augments the pressure of the spring to cause the plunger to move only after a higher pressure is developed in the primary fuel manifold.

Referring again to the shut-off valve 50, this valve is so arranged that once it has been closed it will remain closed until the operator deliberately moves the shut-off lever 348. To accomplish this the sleeve 330 has ports 400 providing communication between the space 339 and a groove 402 in the housing 334. This groove communicates with the drain conduits 92 and 94 such that the pressure in space 339 is the same as the pressure in conduit 94. When the valve plunger 328 is in closed position, ports 404 in the plunger provide communication with a groove 406 in the housing 334 and thence past rib 408 on the sleeve 330 to the groove 402. The pressure acting on the end of the plunger is accordingly the same as that in the space 339 so that the spring 338 holds the plunger resiliently against the seat 352. With this arrangement the plunger will stay in closing position until the sleeve and plunger are both deliberately moved downward by moving the shut-off lever into "on" position. When this occurs a stop 410 on the lower end of the stem 340 of the plunger engages with the sleeve and causes the plunger and sleeve to move downward as a unit thereby opening the shut-off valve.

The exact mechanism of this shut-off valve is not of itself a feature of the present invention. The particular arrangements of the dump valve and pressurizing valve are also not a part of the present invention. These devices have been described for the purpose of clarifying the entire fuel control system.

It is to be understood that the invention is not limited to the specific embodiment herein illustrated and described, but may be used in other ways without departure from its spirit as defined by the following claims.

I claim:

1. A fuel control for a gas turbine power plant including a compressor, a combustor, and a turbine, the fuel control including a source of fuel under pressure, a nozzle, a conduit from said source to said nozzle, first valve means responsive to power plant speed, temperature and pressure in said conduit for establishing maximum fuel flow through said conduit, and second valve means in said conduit in series with and downstream of said first valve means for establishing a minimum flow through said conduit, said second valve means being movable as a function solely of the pressure variations at a predetermined point in the compressor.

2. A fuel control for a gas turbine power plant including a compressor, a combustor, and a turbine, the fuel control including a source of fuel under pressure, a nozzle, a conduit from said source to said nozzle, first valve means responsive to power plant speed, temperature and pressure in said conduit for establishing maximum fuel flow through said conduit, and second valve means in said conduit in series with and downstream of said first valve means for establishing a minimum flow through said conduit, said second valve means being movable as a function solely of the pressure variations at the discharge end of the compressor.

3. In a fuel control for a gas turbine power plant having a compressor, a supply of fuel under pressure, a number of nozzles to which fuel is supplied, a conduit from said supply to said nozzles, a valve in said conduit for metering maximum fuel flow to the power plant, and a plurality of parallel flow paths in said conduit downstream of said maximum fuel valve, valve means in one of said parallel paths metering fuel as an inverse function of power plant speed, and valve means in another path metering fuel as a function of pressure variations at a selected point adjacent the discharge end of said power plant compressor.

4. In a fuel control for a gas turbine, a supply of fuel under pressure, a number of nozzles to which fuel is supplied, a conduit from said supply to said nozzles, a valve in said conduit for metering maximum fuel flow to the turbine, and a plurality of parallel flow paths in said conduit downstream of said maximum fuel valve, valve means in one of said parallel paths metering fuel as an inverse function of speed, and valve means in another path metering a fixed quantity for minimum idle conditions of the turbine.

5. In a fuel control for a gas turbine power plant, a number of fuel nozzles, a source of fluid under pressure, a conduit from the source to the nozzles, and a metering valve in said conduit, said valve including a casing having ports, and a movable valve member having cooperating ports and movable in axial motion and in angular motion to vary the effective area of said ports, in combination with means responsive to power plant speed for moving said valve member in one of said motions, and other means responsive to pressure variations at a selected point in the compressor for moving said valve in the other of said motions, and also responsive to variations in inlet air temperature for moving said valve member in said one of said motions, said casing and said valve member having other cooperating ports located in the conduit downstream of the metering valve, said other cooperating ports functioning to meter fuel as a function of pressure variations in the compressor.

6. In a fuel control for a gas turbine power plant having a compressor, a combustor, and a turbine, and nozzles for discharging fuel into the combustor, said control having a source of fuel under pressure, conduit means from said source to said nozzles, a chamber in said conduit means through which the fuel flows, a metering valve in said conduit means upstream of said chamber for metering maximum fuel into said chamber as a function of turbine speed, compressor air inlet temperature and compressor discharge pressure, and a plurality of other metering means in parallel in said conduit means downstream of said chamber for metering fuel at selected rates.

7. In a fuel control for a gas turbine power plant having a compressor, a combustor, and a turbine, and nozzles for discharging fuel into the combustor, said control having a source of fuel under pressure, conduit means from said source to said nozzles, a chamber in said conduit means through which the fuel flows, a metering valve in said conduit means upstream of said chamber for metering maximum fuel into said chamber as a function of turbine speed, compressor air inlet temperature and compressor discharge pressure, and a plurality of other metering means in parallel in said conduit means downstream of said chamber for metering fuel at selected rates, one of said other metering means providing minimum fuel flow.

8. In a fuel control for a gas turbine power plant having a compressor, a combustor, and a turbine, and nozzles for discharging fuel into the combustor, said control having a source of fuel under pressure, a conduit from said source to said nozzles, a chamber in said conduit through which the fuel flows, a metering valve in said conduit upstream of said chamber for metering maximum fuel into said chamber as a function of turbine speed, compressor air inlet temperature and compressor discharge pressure, and a plurality of flow paths in parallel in said conduit downstream of said chamber, each flow path having means for metering fuel at selected rates, said metering means in said flow paths being in series with said first metering valve, and said metering means in one of the flow paths being a valve movable in response to turbine speed.

9. In a fuel control for a gas turbine power plant having a compressor, a combustor, and a turbine, and nozzles for discharging fuel into the combustor, said control having a source of fuel under pressure, a conduit from said source to said nozzles, a chamber in said conduit through which the fuel flows, a metering valve in said conduit upstream of said chamber for metering maximum fuel into said chamber as a function of turbine speed, compressor air inlet temperature and compressor discharge pressure, and a plurality of flow paths in parallel in said conduit downstream of said chamber, each flow path having means for metering fuel at selected rates, said metering means in said flow paths being in series with said first metering valve, and said metering means in one of the flow paths being a valve movable as a function of compressor discharge pressure for establishing a flow proportional to compressor discharge pressure.

10. In a fuel control for a gas turbine power plant having a compressor, a combustor, and a turbine, and nozzles for discharging fuel into the combustor, said control having a source of fuel under pressure, a conduit from said source to said nozzles, a chamber in said conduit through which the fuel flows, a metering valve in said conduit upstream of said chamber for metering maximum fuel into said chamber as a function of turbine speed, compressor air inlet temperature and compressor discharge pressure, and a plurality of flow paths in parallel in said conduit downstream of said chamber, each flow path having means for metering fuel at selected rates, said metering means in said flow paths being in series with said first metering valve, said metering means in one of the flow paths being a valve, a governor driven by the power plant, means for adjusting said valve by said governor in response to speed changes in the power plant, and manually actuated means for varying the effect of the governor on said valve.

11. A gas turbine power plant including a compressor, a turbine driving the compressor, a combustor through which air from the compressor is delivered to the turbine and in which fuel is burned to heat the air, and a propeller connected to and driven by the turbine, in combination with a fuel control including a source of fuel under pressure, a nozzle, a conduit from said source to said nozzle, a main flow control valve responsive to temperature and pressure variations in the compressor, and other valve means in said conduit for establishing a minimum flow through said conduit, said other valve means being movable as a function of the pressure variations at a predetermined point in the compressor.

12. A gas turbine power plant including a compressor, a turbine driving the compressor, a combustor through which air from the compressor is delivered to the turbine and in which fuel is burned to heat the air, and a propeller connected to and driven by the turbine, in combination with a fuel control including a supply of fuel under pressure, a number of nozzles to which fuel is supplied, a conduit from said supply to said nozzles, a valve in said conduit for metering maximum fuel flow to the turbine, and a plurality of parallel flow paths in said conduit downstream of said maximum fuel valve, one of said parallel paths having a valve therein for metering fuel as an inverse function of speed, and another of said parallel paths having a valve for metering fuel as a function of pressure variations at a selected point within the power plant.

13. A gas turbine power plane including a compressor, a turbine driving the compressor, a combustor through which air from the compressor is delivered to the turbine and in which fuel is burned to heat the air, in combination with a fuel control including a supply of fuel under pressure, a number of nozzles to which fuel is supplied, a conduit from said supply to said nozzles, a valve in said conduit for metering maximum fuel flow to the power plant, and a plurality of parallel flow paths in said conduit downstream of said maximum fuel valve, one of said parallel paths having therein a valve for metering fuel as an inverse function of speed, and another path having a valve therein for metering fuel as a function of pressure variations at a selected point within the power plant.

14. In a fuel control for a gas turbine power plant having a compressor, a combustor, and a turbine, and nozzles for discharging fuel into the combustor, said control having a source of fuel under pressure, conduit means from said source to said nozzles, a chamber in said conduit means through which the fuel flows, a metering valve in said conduit means upstream of said chamber for metering maximum fuel into said chamber as a function of turbine speed, compressor air inlet temperature and compressor discharge pressure, a plurality of other metering means in parallel in said conduit means downstream of said chamber for metering fuel at selected rates and means for regulating the pressure drop across said metering valve and a last one of said other metering means.

15. In a fuel control for a gas turbine power plant having a compressor, a supply of fuel under pressure, a number of nozzles to which fuel is supplied, a conduit from said supply to said nozzles, a valve in said conduit for metering maximum fuel flow to the power plant, and a plurality of parallel flow paths in said conduit downstream of said maximum fuel valve, valve means in one of said parallel paths metering fuel as an inverse function of power plant speed, valve means in another path metering fuel as a function of pressure variations at a selected point adjacent the discharge end of said power plant compressor and means for regulating the pressure drop across said valve and said valve means.

References Cited in the file of this patent

UNITED STATES PATENTS

| | | |
|---|---|---|
| 2,422,808 | Stokes | June 24, 1947 |
| 2,435,902 | Reggio | Feb. 10, 1948 |
| 2,503,048 | Ifield | Apr. 4, 1950 |
| 2,557,526 | Bobier et al. | June 19, 1951 |
| 2,593,536 | Chamberlin et al. | Apr. 22, 1952 |
| 2,622,393 | Edwards et al. | Dec. 23, 1952 |
| 2,628,472 | Dray et al. | Feb. 17, 1953 |
| 2,670,599 | Davies et al. | Mar. 2, 1954 |
| 2,674,847 | Davies et al. | Apr. 13, 1954 |
| 2,759,549 | Best | Aug. 21, 1956 |

FOREIGN PATENTS

| | | |
|---|---|---|
| 941,556 | France | July 19, 1948 |
| 634,095 | Great Britain | Mar. 15, 1950 |

UNITED STATES PATENT OFFICE
CERTIFICATE OF CORRECTION

Patent No. 2,836,957            June 3, 1958

Samuel S. Fox

It is hereby certified that error appears in the printed specification of the above numbered patent requiring correction and that the said Letters Patent should read as corrected below.

Column 10, line 15, for "plane" read --plant--; line 43, for "a last" read --at least--.

Signed and sealed this 29th day of July 1958.

(SEAL)
Attest:

KARL H. AXLINE

Attesting Officer

ROBERT C. WATSON
Commissioner of Patents